Feb. 5, 1952  G. S. BRENCHLEY ET AL  2,584,421
AUTOMATIC SLIDE PROJECTOR
Filed May 24, 1950

Inventors
GEORGE S. BRENCHLEY
SAM GORWITZ
By Jerald P. Welch
Attorney

Patented Feb. 5, 1952

2,584,421

UNITED STATES PATENT OFFICE 2,584,421

AUTOMATIC SLIDE PROJECTOR

George S. Brenchley and Sam Gorwitz, Oshkosh, Wis.

Application May 24, 1950, Serial No. 163,864

1 Claim. (Cl. 88—27)

This invention relates to improvements in automatic slide projectors, and more particularly in a novel automatic slide projector housed in a cabinet.

An object of the invention is to provide a device of the type in which means is provided for rotation of a plurality of slides or films in the path of a ray of light projected through an assembly of lenses onto a screen provided for the purpose.

Another object of the invention is to provide a compact cabinet projection machine of the type with the working parts thereof so arranged as to utilize a minimum of space.

Other and further objects of the invention will appear as the description proceeds, reference being had to the accompanying drawing, in which.

Figure 1:
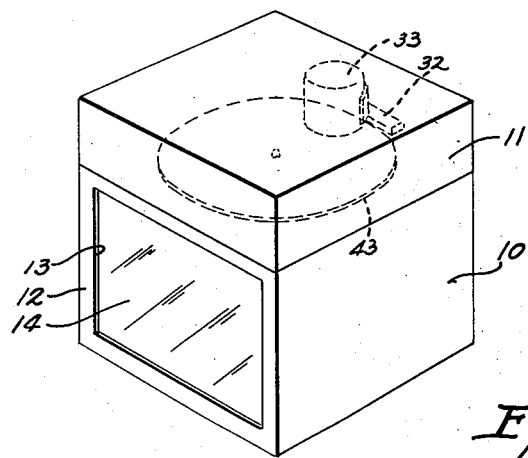
Fig. 1 is a view in perspective of an automatic projector embodying the invention.
Figure 2:
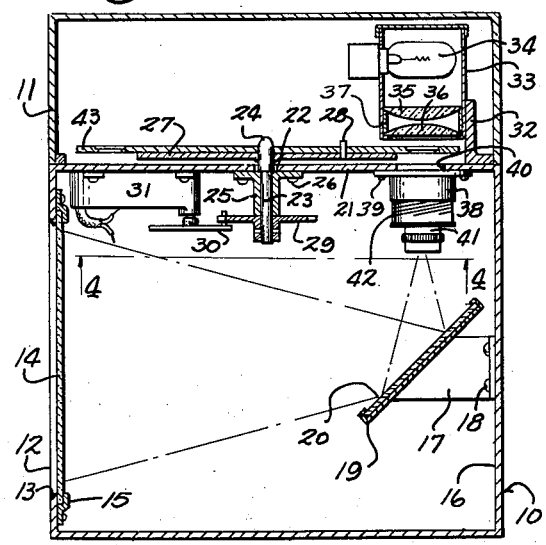
Fig. 2 is a view in vertical section of the same.
Figure 3:
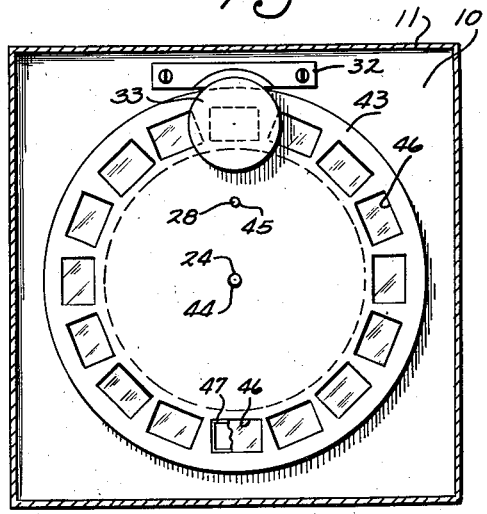
Fig. 3 is a plan view of the machine with the cover removed.
Figure 4:
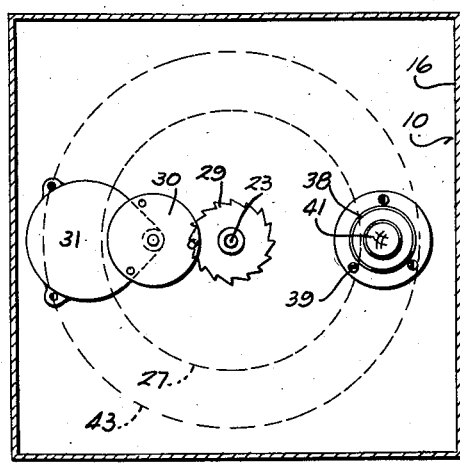
Fig. 4 is a view on line 4—4 of Fig. 2.
Figure 5:
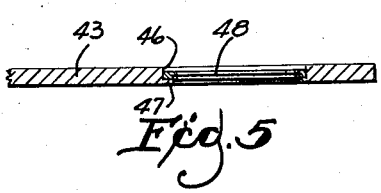
Fig. 5 is a fragmentary vertical sectional view through the disc.

Referring more particularly to the drawing, the numeral 10 refers to a cabinet having a cover portion 11. The front wall 12 of cabinet 10 has a rectangular aperture at 13 thereof inside of which a projection screen 14 is held by means of the retainer frame 15. The interior back wall 16 of the cabinet 10 has a bracket 17 fixed thereon by threaded means 18 and retains an obliquely disposed frame 19 which holds a mirror or reflector 20 therein. A rectangular, horizontal baseboard 21 is held within the top of the cabinet 10 and is apertured centrally at 22 to accommodate a spindle 23 and spindle head 24 retained by a sleeve 25 subjoined to the baseboard 21 by threaded or other means 26. A turntable 27 is fixed for rotation on the spindle head 24 and is provided with an upstanding pin 28. A sprocket 29 is fixed to the lower end of the spindle 23 and is engaged by the sprocket wheel 30 driven by the electric motor 31. A bracket 32 supports the lamp housing 33 containing the electric light bulb 34. A pair of condensing lenses 35 and 36 are held within the lower end of the lamp housing 33 and are properly disposed by means of a spacer ring 37. A socket 38 is secured by means 39 to the baseboard 21 beneath an opening at 40 in said baseboard. The socket 38 retains an enlarging lens 41. The socket 38 contains telescopic means 42 for use in focusing the projection lens 41. A circular disc 43 is adapted for placement on the turntable 27 and is apertured at 44 to permit passage therethrough of the spindle head 24 and is also apertured at 45 to receive the turntable pin 28. The disc 43 is also provided with a plurality of circularly aligned rectangular apertures as at 46. Each aperture 46 has an internal shoulder as at 47 to retain a rectangular slide or film 48 when rested thereon. The lamp bulb 34 and the motor 31 are appropriately wired to a source of current.

In use, a plurality of films or slides 48 are placed within the apertures at 46 of the disc 43. These may constitute a cycle of pictures for use as in advertising or for other purposes. The motor 31 and the lamp bulb 34 are then energized. A ray of light from the lamp bulb 34 will project through the condensing lenses 35 and 36 and through the slide or film 48 which may be in its path and then downwardly through the aperture at 40 in the baseboard 21. The ray of light will then proceed downwardly through the projection or enlarging lens 41 on to the reflector or mirror 20 which being disposed at the appropriate oblique angle will cast the image of the material shown on the slide or film 48 upon the projection screen 14.

The motor 31 will actuate the sprocket wheel 30 which will in turn intermittently rotate the sprocket 29 to rotate the spindle 23 with its spindle head 24, thus also rotating the turntable 27 and the disc 43 secured against slippage by the pin 28. The intermittent rotation of the disc 43 will be so arranged as to properly stop one of the films or slides 48 in the path of the ray of light from the lamp 34 with proper timing.

It will be understood that the device is capable of various modifications in structure and design, without departing from the spirit of the invention, within the scope of the appended claim.

Having thus described the invention, what is claimed and desired to be secured by Letters Patent of the United States, is:

A projector for picture discs including a cabinet, a projection screen forming part of a wall of said cabinet, a horizontal baseboard mounted within the upper portion of said cabinet, a turntable rotatable on said baseboard, a spindle fixed to said turntable and extending downwardly through said baseboard, a sprocket fixed to the lower end of said spindle, a laterally disposed sprocket wheel adapted for intermittent engagement with said sprocket, an apertured disc for film slides held on said turntable, a lamp housing disposed above said baseboard, a lamp therein, a pair of condensing lenses horizontally disposed in the lower end of said lamp housing, a projecting lens under said baseboard, said baseboard having an aperture between said lenses, a mirror obliquely disposed under said lens to reflect an image onto said projection screen, and means for intermittently rotating said sprocket wheel to operate said turntable.

GEORGE S. BRENCHLEY.
SAM GORWITZ.

REFERENCES CITED

The following references are of record in the file of this patent:

UNITED STATES PATENTS

| Number | Name | Date |
|---|---|---|
| 973,003 | Coughlin | Oct. 18, 1910 |
| 1,107,293 | Grad et al. | Aug. 18, 1914 |
| 2,288,074 | Ditty et al. | June 30, 1942 |
| 2,311,056 | Langberg | Feb. 16, 1943 |
| 2,405,706 | Musebeck et al. | Aug. 13, 1946 |

FOREIGN PATENTS

| Number | Country | Date |
|---|---|---|
| 705,328 | France | Mar. 3, 1931 |
| 239,568 | Switzerland | Oct. 31, 1945 |